Sept. 12, 1967  A. R. KANTROWITZ ET AL  3,341,152
MEANS FOR AND METHOD OF CONTROLLING ATTITUDE
OF RE-ENTRY VEHICLE
Filed Sept. 27, 1957  6 Sheets-Sheet 1

ARTHUR R. KANTROWITZ
M. BARON T. GEORGE
HERMAN HALPERN

INVENTORS

BY Alden D. Redfield
Warren Kunz
ATTORNEYS

ARTHUR R. KANTROWITZ
M. BARON T. GEORGE
HERMAN HALPERN

INVENTORS

--- DENOTES ANGULAR IMPULSE $\int_{t_i}^{t_f} |T| dt$

ARTHUR R. KANTROWITZ
M. BARON T. GEORGE
HERMAN HALPERN

INVENTORS

ARTHUR R. KANTROWITZ
M. BARON T. GEORGE
HERMAN HALPERN
INVENTORS

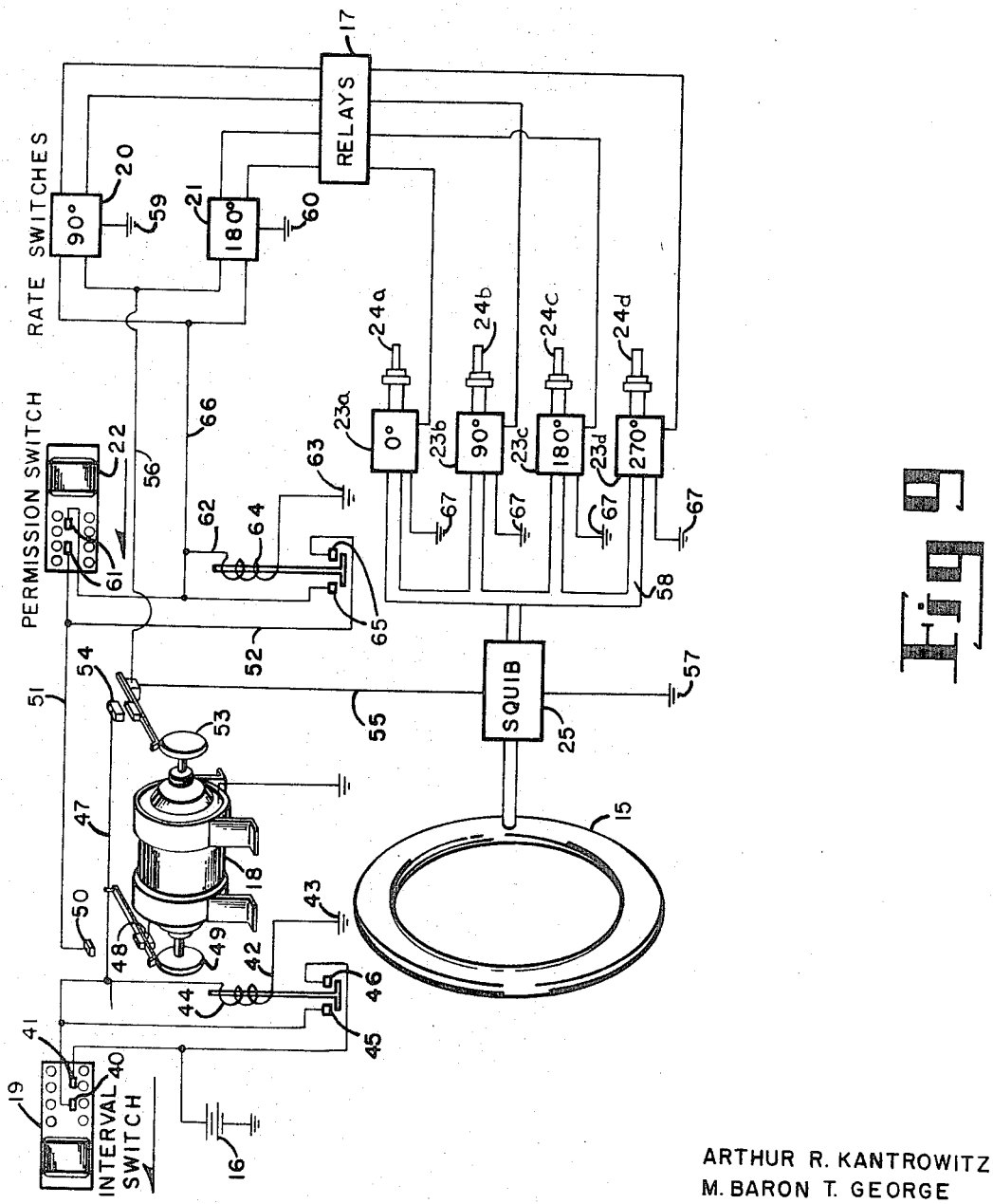

United States Patent Office 3,341,152
Patented Sept. 12, 1967

3,341,152
MEANS FOR AND METHOD OF CONTROLLING ATTITUDE OF RE-ENTRY VEHICLE
Arthur R. Kantrowitz, Arlington, Merton Baron T. George, Melrose, and Herman Halpern, Lawrence, Mass., assignors to Avco Manufacturing Corporation, Cincinnati, Ohio, a corporation of Delaware
Filed Sept. 27, 1957, Ser. No. 688,801
5 Claims. (Cl. 244—3.22)

The present invention relates to weapons and more particularly to a means for and method of controlling the attitude of the re-entry vehicle of a ballistic missile while it is in free flight.

Among new weapons is the intercontinental ballistic missile which may comprise first and second stage rockets for imparting motion to a re-entry vehicle, frequently called a "nose cone," along a predetermined trajectory. The first and second stage rockets are used to propel the nose cone substantially out of the earth's atmosphere. After separation from the last rocket stage, the nose cone alone continues in free flight along a trajectory determined by the initial energy and direction imparted to it. While travelling along the trajectory after separation, the nose cone is not subject to external control or guidance but travels much like a projectile and hence is frequently called a "ballistic missile." The trajectory is chosen so that at the end of its flight the nose cone destroys a pre-selected target. Included in the nose cone is a warhead, usually of the hydrogen bomb type, which may be detonated at the target to provide either an air-burst or a ground-burst.

In its travel the nose cone is subjected to severe environmental conditions. It first experiences launching accelerations and vibrations, in addition to slight aerodynamic heating. During the mid-course of its travel, it may be struck by micrometeorites of high velocity and experiences heating due to radiation from the sun. During re-entry through the earth's atmosphere as it approaches its target, it undergoes extremely severe aerodynamic heating and deceleration. A shock wave forms ahead of the nose cone and the gas behind this shock wave becomes dissociated and ionized; its temperature may exceed that at the surface of the sun. The nose cone must survive these conditions and detonate its warhead at the target with a high degree of reliability.

To assure proper detonation and to avoid destructive heating, the nose cone must assume a definite, front-foremost attitude as it passes through increasingly dense atmosphere in approaching its target. It is the purpose of this invention to provide a means for and method of controlling nose cone attitude to assure satisfactory performance in these respects.

A rigid body, moving freely through space, has six degrees of freedom: three translational and three rotational; hence, a complete definition of its position requires the specification of six quantities. In accordance with this invention, movement of the nose cone along its trajectory is made a function of the initial energy and direction imparted to it, and translation in any direction is not controlled during free flight. However, rotation about its longitudinal axis (roll), rotation about its lateral axis (pitch) and rotation about its vertical axis (yaw) may be controlled. The present invention relates only to control of pitch and yaw and, as used in this specification, the term "attitude control" refers to heading the nose cone directly into the air flow over it. The speed of the vehicle is so high that attitude control is substantially accomplished when the longitudinal axis of the vehicle is aligned in the proper fore and aft sense with the trajectory or path of travel of its center of gravity, since the direction of air flow and trajectory practically coincide at any instant. For convenience, therefore, reference may be made to alignment of the nose cone with its trajectory.

Briefly described, the present invention comprises a means for and method of attaining attitude control by reference to the trajectory of the vehicle. This may be conveniently done by making the vehicle aerodynamically stable and sensing its oscillations about the trajectory. Damping of such oscillations is easily effected by application of forces at intervals determined by the oscillations of the vehicle. For sensing oscillations, rate switches may be used. These may be electrically connected to solenoid valves which control effluence of gas through nozzles to provide the damping forces.

In view of the foregoing, it will be understood that a broad object of the present invention is to provide an improved means for and method of controlling the attitude of a vehicle during the time that it re-enters the earth's atmosphere.

More specifically, it is an object of the present invention to provide means for and a method of controlling the attitude of a re-entry vehicle by reference to its trajectory.

Still more specifically, it is an object of this invention to provide means for and a method of producing forces necessary for damping oscillations of a re-entry vehicle to an acceptable minimum.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 9 is a diagram showing the electrical circuit of the attitude control system.

Flight conditions

Figure 1:
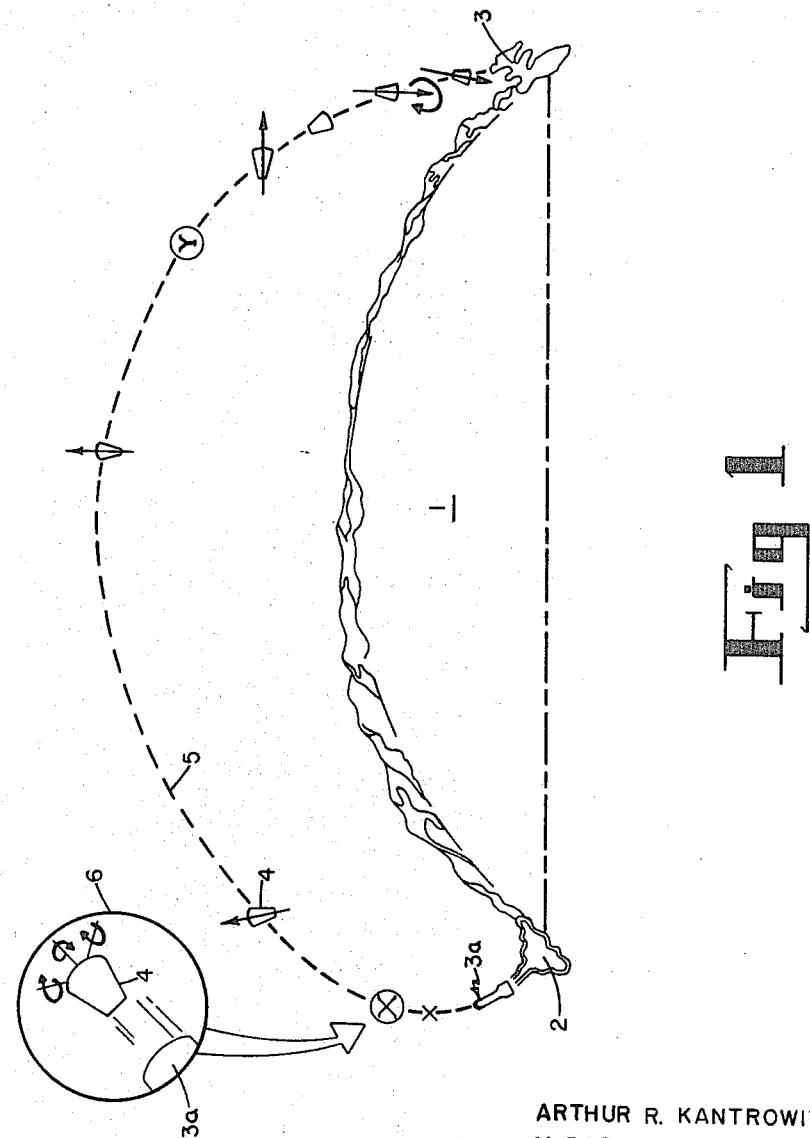
FIG. 1 is a diagrammatic representation of a re-entry vehicle travelling along a trajectory from its point of take-off to the target.

FIG. 1 represents a view of the earth 1 including point of take-off 2 and target 3. Multi-stage rockets, generally designated 3a, are used at take-off to carry the re-entry vehicle or nose cone 4 aloft and to impart sufficient energy and a preferred direction to it for it to follow trajectory 5 from the point of take-off to the target. The last stage rocket separates from the nose cone at the point marked X on the trajectory, which may be at an altitude of approximately 800,000 feet, and the nose cone continues alone in free flight along its trajectory. During separation, perturbations may be inadvertently introduced about each axis of the nose cone, as indicated pictorially in the enlarged circle 6 associated with separation point X. Since immediately thereafter the damping forces acting on the nose cone are negligible, these perturbations will persist as the nose cone passes along the trajectory to point Y, at which point the nose cone begins to be influenced by aerodynamic forces that become significant below an altitude of approximately 350,000 feet. At this point, because of the aerodynamically stable shape of the nose cone, it starts to orient itself to approximately the correct attitude with its front foremost along the trajectory. As will be explained more fully hereinafter, attitude control is of great importance after the nose cone descends below this altitude. The method of attaining such attitude control will be described shortly.

Structure of the nose cone

Figure 2:
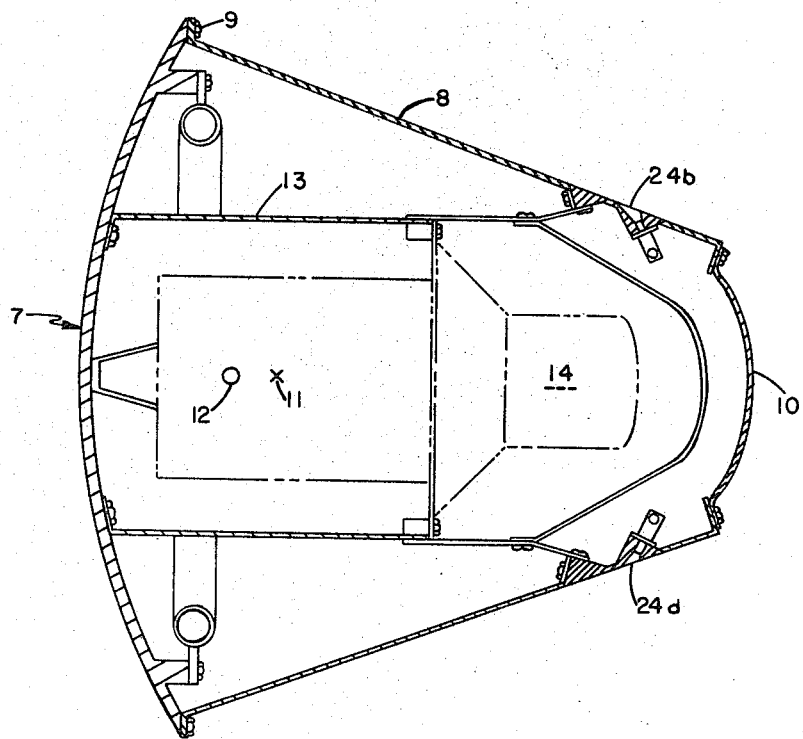
FIG. 2 is a longitudinal sectional view of the re-entry vehicle.

Attention is now directed to FIG. 2 which shows the nose cone in longitudinal section. The front of the nose cone, generally designated 7, constitutes a highly polished heat sink having sufficient thermal capacity to hold the final temperature of the nose cone to an acceptable value. It will be appreciated by those skilled in the art that aerodynamic friction during the re-entry period generates an enormous amount of heat which, if the heat sink were not properly designed, would quickly destroy the entire nose cone. The afterbody of the nose cone, generally designated 8, is attached to the heat sink, as at 9. A removable cover 10 is attached to the rear of the afterbody to permit access to certain components within the nose cone.

The extremely high temperature conditions make it mandatory that the heat sink of the nose cone be foremost during re-entry both to prevent its own destruction by excessive heat input and destruction of the rest of the nose cone. This is assured by utilizing an external shape for the nose cone which is aerodynamically stable at hypersonic velocities, in combination with an attitude control system. Not only is it symmetrical but the nose cone is also shaped so that the center of pressure 11 of aerodynamic forces acting on the frontal area 7 is located behind the center of gravity 12.

A central structural cylinder 13 is provided within the nose cone for mounting the warhead 14 and other internal components to be described shortly.

Figure 3:
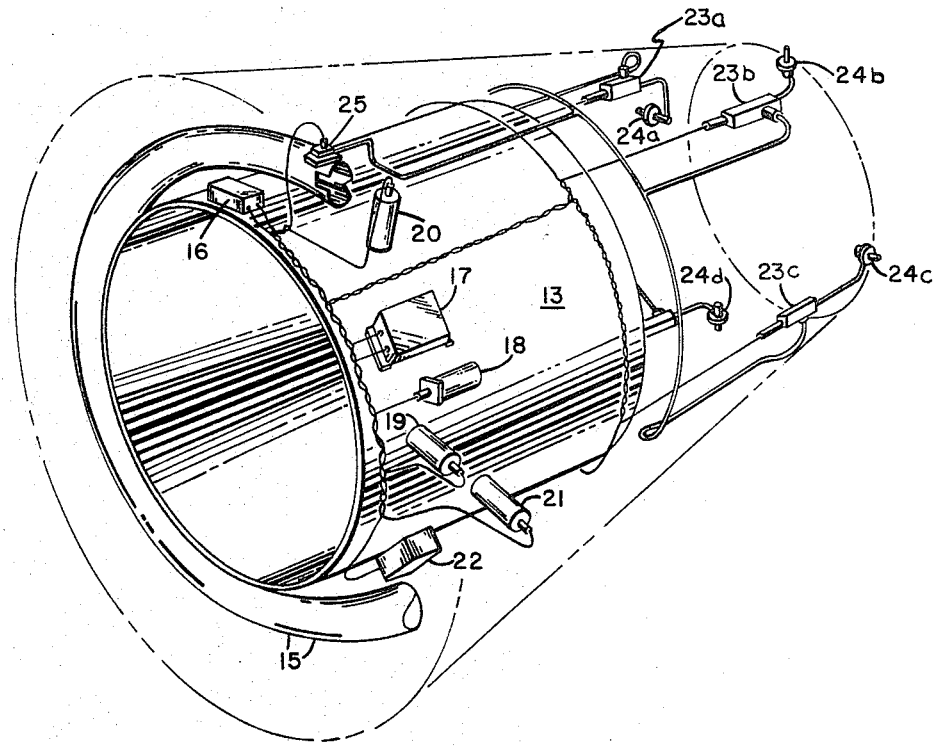
FIG. 3 is a perspective view of certain interior portions of the vehicle.

Certain of these components are illustrated in FIG. 3. They include a toroidal gas tank 15, battery 16, relay 17, timer 18, interval switch 19, rate switches 20 and 21, permission switch 22, solenoid valves 23a–23d, reaction nozzles 24a–24d, and squib valve 25. These components comprise the essential elements of an attitude control system employing the method of this invention and will be discussed in greater detail hereinafter.

Nose cone oscillation and damping

FIGS. 4 through 7 illustrate the nature and importance of nose cone damping. The quantities shown in these graphs are merely exemplary and should not be deemed limitations of the invention.

Figure 4:
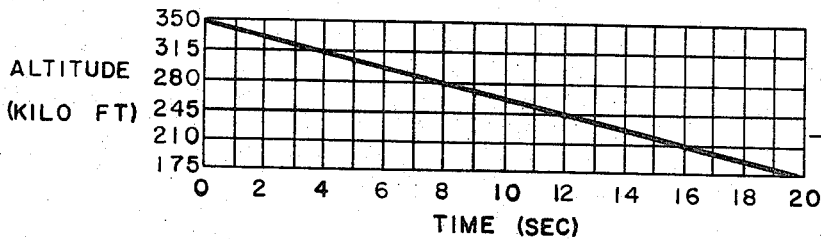
FIGS. 4 through 7 are graphs representing the altitude and attitude of the nose cone during the time that it is re-entering the earth's atmosphere.

FIG. 4 illustrates the altitude of the nose cone during the 20-second period prior to detonation at the target. It is during this period, while the nose cone descends from approximately 350,000 feet to 240,000 feet altitude, that the attitude control system functions to damp aerodynamic oscillations and rotations that may be present. The curves are based on the assumption that the nose cone enters the atmosphere at 350,000 feet altitude displaced 170° from the front-foremost position and at zero angular velocity. In other words, for illustrative purposes, the severe assumption is made that the nose cone re-enters the atmosphere almost backwards. As aerodynamic forces become significant, during a time when nose cone heating is not severe, the inherent aerodynamic stability of the nose cone causes it to rotate in space changing its angle of attack as indicated by the full line curve 26 of FIG. 5. As the angle of attack is brought to zero, aerodynamic forces impart sufficient rotational energy to the nose cone to set up nearly undamped angular oscillations (pitch and yaw) about the flight path indicated by a full line curve 26 after time=11.4 seconds. Were these allowed to prevail during the remainder of the re-entry period, the corner of the heat sink and the afterbody of the nose cone would be subjected to a high rate of heating and destructively high temperatures. Further, even if the nose cone survived, detonation near the target would become uncertain. Hence, damping of these oscillations is of prime importance. Special means must be provided for doing so since natural aerodynamic damping is very small and insufficient to damp the oscillations prior to destruction of the nose cone through excessive heating.

In accordance with this invention, one method of damping is to develop reaction forces through controlled effluence of gases from nozzles, such as 24a–24d, illustrated in FIG. 3.

Figure 5:
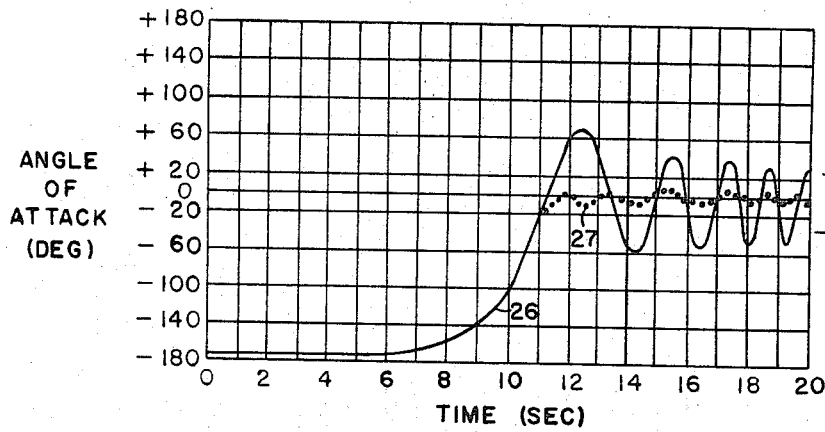
Figure 6:
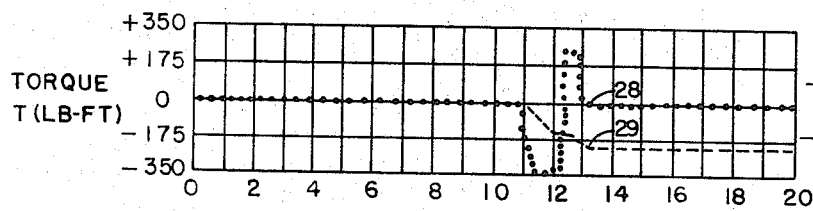

By application of these forces, oscillations of the nose cone can be quickly reduced to an acceptable minimum illustrated by curve 27 in FIGURE 5. The torque produced by the nozzles is illustrated by curve 28 in FIGURE 6, curve 29 representing the angular impulse of the nozzles, being the integral of the reaction torques during the time in which they act. Note that damping may be effected in less than two seconds and therefore requires a relatively small weight of compressed gas from tank 15.

Figure 7:
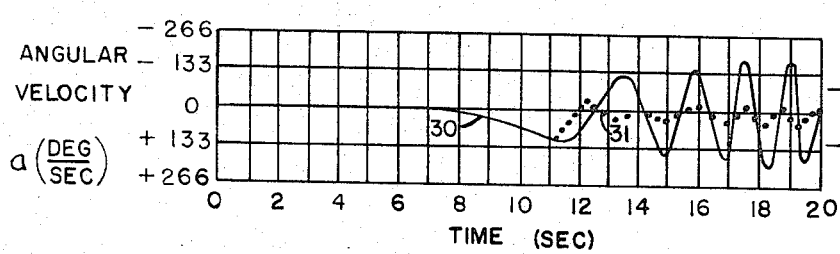

Curve 30 of FIG. 7 represents the angular velocity of an undamped nose cone. It will be noted that the angular velocities increase in magnitude as altitude decreases and aerodynamic forces, resulting from the increasingly dense atmosphere, become increasingly effective. These increasing larger forces also result in increased frequency of oscillation. The high angular accelerations associated with the high frequency oscillations combined with the high decelerations along the trajectory increase the difficulty of providing satisfactory mechanical and structural designs for the nose cone and the equipment contained therein.

Curve 31 in FIG. 7 represents angular velocities which prevail in a damped nose cone employing the method of this invention. It will be noted that the angular velocities have been greatly reduced by the damping system. It will also be noted that the angular accelerations (time rates of change of the angular velocities) have been greatly reduced by the damping system.

Attitude control system

Figure 8:
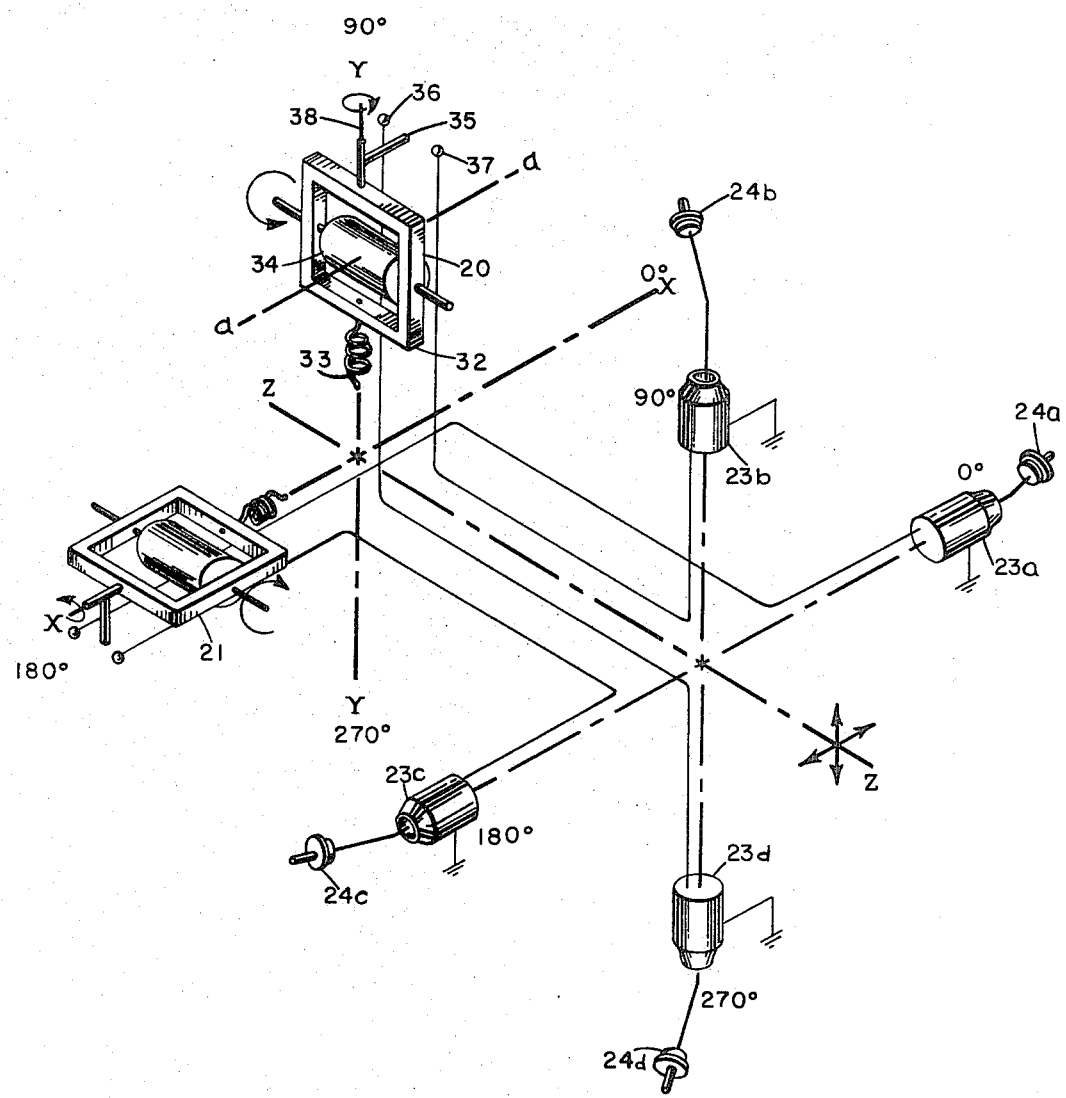
FIG. 8 is a schematic representation of an attitude control system for producing reaction forces for damping vehicle oscillations.

The operation of the attitude control system can be readily understood by reference to FIG. 8. The figure is highly diagrammatic and shows rate switches 20 and 21 connected to solenoid valves 23a, 23b, 23c and 23d, controlling flow of gas to associated nozzles 24a, 24b, 24c and 24d.

The rate switches are conventional single-degree-of-freedom rate gyroscopes. Since they are identical in construction, only one rate switch 20, will be described. This includes a gimbal 32 which is rotatable about the y—y axis, which may be considered the vertical axis of the nose cone. Any rotation of the gimbal about this axis is opposed by spring 33. The gimbal rotatably supports a high speed rotor 34 which is the source of gyroscopic torques in the rate switch. The gimbal also has fixedly attached to it an electrical contact arm 35 which can establish electrical connection with either contact 36 or contact 37. A common electrical input 38 makes electrical potential available at arm 35 at all times.

The operation of the rate switch during oscillation of the nose cone can best be understood by reference to the principal axes of the nose cone. In FIG. 8 the transverse axis is designated x—x and the vertical axis is designated y—y, while the longitudinal axis is designated z—z. Assuming for purposes of illustration that the nose cone is rotating counterclockwise about axis x—x as viewed from the left end thereof, rate switch 20 is subjected to a comparable angular velocity about its input axis a—a which is parallel to axis x—x. This produces an output torque about the output axis of the gyro (coincident with axis y—y) in a clockwise direction as viewed from above, carrying electrical contact arm 35 (against the opposition of spring 33) into engagement with contact 37. This energizes solenoid valve 23b, and, as will be explained later, permits flow of gas under pressure to nozzle 24b. Effluence of gas from nozzle 24b produces a reaction force in opposition to the prevailing angular velocity of the nose cone. In other words, the reaction force produces a torque about the x—x axis which serves to damp the angular oscillation of the nose cone.

In a comparable manner, clockwise oscillation of the nose cone about axis x—x produces a counterclockwise rotation of the rate switch about its output axis and produces a torque in the rate switch in opposition to spring 33 and carries electrical contact arm 35 into engagement with contact 36. This completes the electrical circuit through solenoid valve 23d and permit effluence of gas from nozzle 24d, producing reaction damping force and counterclockwise torque about the x—x axis.

In a similar manner, rate switch 21 senses angular oscillations of the nose cone about the vertical axis y—y and controls flow of gas through nozzles 24a and 24c, to damp such oscillations.

The angle of rotation of each rate switch is a function of the input angular velocity and the spring constant of its spring 33.

*Control system circuit*

With the foregoing description in mind, the electrical circuit of the attitude control system, shown in FIGURE 9, will be readily understood. The entire circuit is inoperative until the interval switch 19, which is a conventional accelerometer, senses a 7g positive acceleration. This occurs during the initial take-off period when the first and second stage rockets are carrying the nose cone into the atmosphere. At this acceleration, contacts 40 and 41 are closed and complete the circuit from battery 16 through conductor 42 to ground at 43. This energizes holding coil 44 and completes the circuit across contacts 45 and 46. This assures that a a later time, when the interval switch is no longer subjected to such a large acceleration, current will be available in conductor 47.

Timer 18 is energized from conductor 47 through normally closed contacts 48. Opening of these contacts and deenergization of the timer is controlled by rotation of cam 49 which is driven by the timer. It is important to note that the control circuit is arranged so that contacts 48 must open before the damping portion of the system is activated. In this way the damping system is kept inactive for a definite time period until the nose cone is well along its trajectory in free flight and free of extraneous virbrations. The time between energization of the timer and opening of contacts 48 may be chosen to suit the particular flight duration of the nose cone and for a flight of half-an-hour's duration may equal approximately twelve minutes. At the end of this time, cam 49 opens contacts 48 and closes the upper contacts 50 supplying electrical potential to conductors 51 and 52. As a result, this portion of the circuit is prepared to function as soon as permission switch 22 closes, as will be described shortly.

Shortly before the closing of contacts 50, for example, 1½ minutes before, cam 53 closes normally open contacts 54, connecting conductor 47 to conductors 55 and 56. This accomplishes two things: (1) Current flowing through conductor 55 to the ground at 57 passes through squib valve 25 and detonates a charge provided therein, opening an internal valve (not shown) to permit flow of gas under high pressure from toroidal tank 15 to manifold 58 (through this manifold the high pressure gas flows to solenoid valves 23a–23d); (2) current flows through conductor 56 and rate switches 20 and 21 to ground at 59 and 60 respectively. This energizes electrical motors (not shown) associated with the rotors of the rate switches and brings them up to full operating speed.

Application of damping torque is delayed until the nose cone is subjected to aerodynamic forces which significantly affect its motion. This is indicated by the permission switch. Although numerous devices may be used as a permission switch, an angular accelerometer, for sensing oscillation of the nose cone, or a linear accelerometer, for sensing its deceleration, are particularly suitable. In the preferred embodiment, a linear accelerometer, parallel to the longitudinal axis of the nose cone, serves as the permission switch and is set to close at .06 g negative acceleration. For conditions as illustrated by the curves, this occurs at approximately 275,000 feet altitude. The negative acceleration results from nose cone deceleration due to its entering the upper atmosphere, and closing of the permission switch signifies that the nose cone has attained approximately a front-foremost position and a low angle of attack (angle between z—z axis and trajectory) favorable to effective application of damping torque. Although the atmosphere is at first so thin that the nose cone heating is not serious, the rate of heating rapidly increases as does the angular rate of nose cone oscillation, and consequently the torque necessary to attain satisfactory control. Hence, damping is desirable as soon as possible, consistent with favorable positioning of the nose cone signified by the permission switch, and preferably should be completed during the first oscillation.

The permission switch includes normally open contacts 61 which are closed at the pre-determined negative acceleration to complete the circuit from conductor 51 through conductor 62 to ground at 63. This energizes holding coil 64 which closes contacts 65, assuring flow of current to conductor 66 in case the permission switch should open thereafter. It is this current which is supplied to the common contacts, such as 38 in FIG. 8, of the rate switches. If the rate switches detect angular velocities of the nose cone in excess of .3 radian per second at the time the permission switch closes or thereafter, relays 17 are energized, through contact arms 35 (see FIG. 8) permitting flow of current through solenoid valves 23a–23d to ground at 67. This permits flow of high pressure gas from manifold 58 to nozzles 24a–24d associated with the solenoid valves which are energized. As has been explained, the resulting effluence of gases rapidly damps nose cone oscillations prior to re-entry into that portion of the atmosphere where heating would become serious.

The relays 17, which were omitted from FIG. 8 in the interest of clarity, are of a conventional type and avoid the need for passing sizeable current, such as required to operate solenoid valves, through the rate switches.

As described generally in connection with FIG. 8, rate switch 20, located at the 90° position (see FIG. 8) on the y—y axis associated with solenoid valves 23b and 23d, located at the 90° and 270° positions. It will also be noted that the rate switch 21 located at the 180° position controls flows of current to solenoid valves 23a and 23c located at the 0° and 180° positions. It will be appreciated that at any one time, any one rate switch only energizes one of its associated solenoid valves. It will also be understood that under certain operating conditions, where the principal plane of oscillations lies between the rate switches, both rate switches may simultaneously energize solenoid valves to damp the oscillations.

The rate switches are damped and have a damping ratio or factor of .6. This value is a desirable compromise assuring rapid response with no objectionable overtravel.

To avoid hunting, the rate switches are adjusted so that no energization of solenoid valves results when angular velocities of the nose cone are less than .3 radian per second. This is illustrated in FIG. 7 by curve 31 which shows small positive and negative angular velocities relative to the zero reference axis of the graph. It will also be noted with reference to curve 27 of FIG. 5 that small variations in the angle of attack are permissible after major oscillations of the nose cone have been damped. The present invention is designed to damp nose cone oscillations to less than ±5° at a 175,000-ft. altitude, which will result in ±3° at a 100,000-ft. altitude. As the oscillation envelope decreases in size with decrease of altitude, the frequency of the oscillations increase slightly as suggested by FIG. 5.

Should the nose cone be spinning at the time reaction damping forces are applied, precessional movements may occur that will delay slightly complete attitude correction. The corrective forces are sufficiently high, and the rate of spin low enough (no greater than .05 radian/sec.), however, to assure damping to an acceptable value before the nose cone is subjected to a high rate of heating.

In view of the foregoing description of this invention, it will be apparent that there is provided an improved attitude control system and method for a re-entry vehicle. Oscillations of the vehicle can be rapidly and effectively damped to acceptable limits through simple, inexpensive lightweight and safe equipment having a high degree of reliability. It should be noted that all elements of the system are within the present state of the art and that no complex circuitry is involved. All of this is highly desirable in a missile which must be produced on a mass scale and handled by relatively unskilled personnel.

A preferred embodiment of the invention having been described, there is claimed:

1. In a re-entry vehicle, an attitude control system comprising means for detecting deceleration of the vehicle and the existence of a low angle of attack relative to its trajectory, gyroscopic means for detecting oscillations in pitch and yaw of the vehicle relative to the trajectory, and damping means controlled by said first and second named means for producing periodic forces for damping oscillations of the vehicle.

2. In an aerodynamically stable re-entry vehicle for movement along a trajectory, an attitude control system comprising a linear accelerometer for detecting deceleration of the vehicle parallel to the longitudinal axis thereof and orientation of the vehicle at a small angle of attack relative to the trajectory, rate switches within the vehicle for detecting angular oscillations thereof about the trajectory, and damping means electrically controlled by said linear accelerometer and said rate switches for producing reaction forces for damping the oscillations of the vehicle.

3. Apparatus as defined in claim 2 in which said linear accelerometer is electrically connected in series with said rate switches and both must be operative to permit said damping means to damp oscillations of the vehicle.

4. The method of controlling the attitude of a re-entry vehicle relative to its trajectory, the vehicle being aerodynamically stable but subject to oscillations about its pitch and yaw axes comprising detecting the existence of a small angle of attack of the vehicle relative to its trajectory, detecting the direction of movement and angular velocity of the vehicle during oscillation, and applying damping forces to the vehicle to produce torque in opposition to the oscillations when they are of a magnitude such that the angular velocity exceeds a predetermined value.

5. The method of controlling the attitude of an aerodynamically stable vehicle relative to its trajectory during re-entry into the atmosphere which comprises detecting deceleration of the vehicle due to its re-entering the atmosphere, detecting that the vehicle is approximately aligned front-foremost with its trajectory, detecting the presence of angular oscillations of the vehicle relative to its trajectory, and applying damping forces in opposition to the oscillations.

References Cited

UNITED STATES PATENTS

| | | | |
|---|---|---|---|
| 2,393,604 | 1/1946 | Berger | 102—2 |
| 2,398,795 | 4/1946 | Manson et al. | 244—152 |
| 2,764,375 | 9/1956 | Lemoigne | 244—152 |
| 2,789,506 | 4/1957 | Filbert et al. | 102—70.2 |
| 2,812,398 | 11/1957 | Mickman | 200—61.45 |
| 2,822,755 | 2/1958 | Edwards et al. | 102—50 |
| 2,856,142 | 10/1958 | Haviland | 244—14 X |
| 2,935,942 | 5/1960 | De Young et al. | 102—3 |
| 2,936,710 | 5/1960 | Bollay | 102—50 |
| 2,968,454 | 1/1961 | Merrill et al. | 102—49 |
| 2,989,270 | 6/1961 | Waldow | 244—14 |

FOREIGN PATENTS

| | | |
|---|---|---|
| 879,835 | 12/1942 | France. |
| 305,620 | 7/1916 | Germany. |

BENJAMIN A. BORCHELT, *Primary Examiner.*

SAMUEL BOYD, SAMUEL FEINBERG, ARTHUR M. HORTON, *Examiners.*

W. J. CURRAN, D. H. WARD, F. J. LEES, P. G. BETHERS, V. R. PENDEGRASS, *Assistant Examiners.*